UNITED STATES PATENT OFFICE.

AARON B. SIMPSON, OF CAMDEN, OHIO.

IMPROVEMENT IN MEDICAL COMPOUNDS FOR SKIN DISEASES.

Specification forming part of Letters Patent No. 136,554, dated March 4, 1873.

*To all whom it may concern:*

Be it known that I, AARON B. SIMPSON, of Camden, in the county of Preble and State of Ohio, have invented a new and valuable Improvement in Medical Compounds; and I do hereby declare that the following is a full, clear, and exact description of the same.

My invention has relation to medical compounds; and consists of the ingredients hereinafter named, combined in the proportions and according to the methods below given.

Take of poke root, one and one-half ounce; May-apple root, one and one-half ounce; stillingia root, one and one-half ounce; blue flag root, one and one-half ounce; burdock root, one and one-half ounce; dandelion root, one and one-half ounce; sarsaparilla root, one and one-half ounce. Add to the above three quarts of water, and reduce to one quart by boiling. Then strain, and add one-half ounce of iodide of potassa; one-half pint of alcoholic liquor; one pound of sugar; or filter or macerate the first-named ingredients, finely pulverized, in one quart of water and one pint of alcoholic liquor, and then strain and add one ounce of iodide of potassa, and one pound of sugar.

This compound is to be taken in proper doses for the cure of scrofula and other diseases of the blood.

What I claim as new is—

The combination of the ingredients herein specified, in the proportions named, substantially as and for the purpose described.

In testimony that I claim the above I have hereunto subscribed my name in the presence of two witnesses.

A. B. SIMPSON.

Witnesses:
   A. B. KING,
   C. M. ROHRER.